(12) United States Patent
Maier et al.

(10) Patent No.: US 10,219,645 B2
(45) Date of Patent: Mar. 5, 2019

(54) ELECTRIC FOOD PROCESSING DEVICE

(71) Applicant: KONINKLIJKE PHILIPS N.V., Eindhoven (NL)

(72) Inventors: Dieter Johann Maier, Eindhoven (NL); Thomas Schlug, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 122 days.

(21) Appl. No.: 15/126,107

(22) PCT Filed: Mar. 24, 2015

(86) PCT No.: PCT/EP2015/056168
§ 371 (c)(1),
(2) Date: Sep. 14, 2016

(87) PCT Pub. No.: WO2015/150152
PCT Pub. Date: Oct. 8, 2015

(65) Prior Publication Data
US 2017/0007063 A1    Jan. 12, 2017

(30) Foreign Application Priority Data

Mar. 31, 2014   (EP) .................................... 14162532

(51) Int. Cl.
| | | |
|---|---|---|
| A23N 1/00 | (2006.01) |
| A47J 19/02 | (2006.01) |
| A47J 43/046 | (2006.01) |
| A47J 43/07 | (2006.01) |
| A47J 43/25 | (2006.01) |

(52) U.S. Cl.
CPC .......... *A47J 19/022* (2013.01); *A47J 43/046* (2013.01); *A47J 43/0716* (2013.01); *A47J 43/255* (2013.01)

(58) Field of Classification Search
CPC .... A47J 19/022; A47J 43/046; A47J 43/0716; A47J 43/325
USPC .......... 99/503, 511, 512; 426/431, 433, 489
See application file for complete search history.

(56) References Cited

U.S. PATENT DOCUMENTS

| | | | |
|---|---|---|---|
| 3,916,776 A * | 11/1975 | Arao ..................... | A47J 19/027 366/349 |
| 5,386,766 A | 2/1995 | Segredo | |
| 6,375,996 B1 | 4/2002 | Suter | |
| 2002/0009017 A1 | 1/2002 | Kolar | |
| 2005/0178863 A1 | 8/2005 | Carnevale | |
| 2007/0273311 A1 | 11/2007 | Guinet | |
| 2008/0190305 A1 * | 8/2008 | Zhu ..................... | B26D 7/0616 99/537 |
| 2008/0221739 A1 | 9/2008 | Pryor | |
| 2013/0108754 A1 * | 5/2013 | Blanc ................. | A47J 31/3623 426/431 |

(Continued)

FOREIGN PATENT DOCUMENTS

| | | |
|---|---|---|
| JP | 2004129502 A | 4/2004 |
| JP | 4931873 B2 | 5/2012 |

(Continued)

*Primary Examiner* — Thien S Tran (57) ABSTRACT

An electric food processor is of the type in which the user applies pressure to the food item against a rotary processing member (4) against during processing. A pressure indicator (10) is provided for displaying a signal at least representing the user-applied pressure.

17 Claims, 8 Drawing Sheets

(56) References Cited

U.S. PATENT DOCUMENTS

2014/0154384 A1\* 6/2014 Vardakostas ............. A21C 9/04
426/531

FOREIGN PATENT DOCUMENTS

| KR | 20030003156 A | 1/2003 |
|----|---------------|--------|
| WO | 2010030521 A2 | 3/2010 |

\* cited by examiner

ELECTRIC FOOD PROCESSING DEVICE

This application is the U.S. National Phase application under 35 U.S.C. § 371 of International Application No. PCT/EP2015/056168, filed on Mar. 24, 2015, which claims the benefit of International Application No. 14162532.7 filed on Mar. 31, 2014. These applications are hereby incorporated by reference herein.

FIELD OF THE INVENTION

This invention relates to electric food processing devices, particularly of the type in which a foodstuff is pressed against a processing surface.

BACKGROUND OF THE INVENTION

Many different type of food processor require a foodstuff to be pressed against a rotary processing surface. The processing surface then performs juicing, grating, cutting, masticating, dicing or mincing for example.

To avoid danger of a user's fingers coming into contact with the processing surface, a chute is provided into which the foodstuff is loaded, and a pressure applicator is provided which is a clearance fit in the chute. The user applies a force to the pressure applicator to push the foodstuff against the processing member.

The food processing is thus not fully automated, and the user applies a force which can vary. In the case of a juicer, if a too high force is applied, the juice-to-pulp ratio is lower and so the extracted juice output quantity will be lower.

For all food processors, applying a high force will result in a higher power consumption and this can also harm the motor and can lead to unwanted overheating or breakage of the motor.

A high applied pressure will also result in the food processing member becoming blunt prematurely and/or clogged.

There are also problems associated with a pressure which is too low. The processing will take longer, therefore shortening the life of the device, and also the food processing again may not be optimum. For example, the foodstuff may need to advance at a certain rate towards a grating surface for effective results.

SUMMARY OF THE INVENTION

The invention is defined by the claims.

According to an embodiment of the invention, there is provided an electric food processor comprising:

an input opening for receiving a food item to be processed;

a pressure applicator adapted to be received in the input opening, to enable pressure to be applied to the food item by the user during processing;

a rotary processing member against which the food item is to be pressed during processing; and a motor for driving the rotary processing member, wherein the food processor further comprises a pressure indicator for displaying a signal representing the user-applied pressure.

This food processor provides a pressure indication to the user. This enables the user to apply a pressure to the food item which is most suitable to achieve the best processing results.

The pressure indicator may comprise a light which indicates when the user-applied pressure is too high.

This provides a simple output to a user to enable him/her to regulate the pressure applied in an intuitive way.

The pressure indicator may instead comprise a set of lights which indicate that the user-applied pressure is too high, or too low, or at a suitable level.

This enables the user to regulate the pressure applied, with feedback as to whether the pressure needs to be increased or decreased. There may be more than three indicators, so that the feedback indicates the amount of pressure being applied as well as whether it is too high or too low for optimum food processing efficiency.

The pressure indicator may instead or additionally comprises a sound or tactile output which indicates when the user-applied pressure is too high.

A current sensing arrangement may be provided for sensing a drive current of the motor, wherein the drive current is representative of the user-applied pressure.

In this way, pressure sensing is carried out based on the motor drive conditions, so that no separate pressure sensor is needed. A simple circuit can be used with good reliability and low cost.

In one arrangement, the current sensing arrangement may comprise a current sensing resistor and voltage measurement unit. In another arrangement, the current sensing arrangement may comprise a current sensing transformer and voltage measurement unit.

The output of the current sensing arrangement may be suitable for direct use to generate the pressure indication. However, alternatively, a circuit may be provided for generating a pressure indication signal from the sensed current.

The current sensing may be of an ac current or of a dc current. If a dc motor is used, a dc current can be sensed. However, ac current may instead be sensed. Thus, the sensing arrangement can be implemented in different ways depending on the type of motor and the other circuitry of the food processor.

The food processor may comprise a juicer, wherein the rotary processing member comprises a juicing member.

In a juicer, the effectiveness of the juicing is dependent on the applied pressure, in particular with an inverse relationship. Thus, a user may intuitively feel that applying a greater pressure will improve the juicing, whereas the opposite may be the case. By providing a pressure indication, the user can regulate the pressure applied even if it is counter-intuitive.

The juicer preferably further comprises an outlet to which the extracted juice is provided during juicing and a vessel in the form of a pulp container for storing the pulp, and further comprises an indicator to indicate when the pulp container is full.

A full pulp container will also reduce the effectiveness of the juicing so an indication of this is also of interest.

A current sensing arrangement may again be provided for sensing a drive current of the motor wherein the pulp container is determined as full based on the current sensed. The load on the motor is again altered if the pulp container is full.

In this way, the same current sensing arrangement for determining the applied pressure can be used to derive a full container alert. Different thresholds can be provided for providing pressure indication information from the sensed current and full container alert information. For example, the pulp container can be determined as full based on a minimum value of the current sensed. This represents a continuously applied pressure to the rotary processing member, which differs from the cyclic pressure applied by the user.

An indicator can then be provided to indicate when the pulp container is determined as full. This prevents the user continuing to use the juicer when the effectiveness will be reduced and the load on the motor increased because the pulp container is full.

An interrupt may be provided to halt operation of the motor when the pulp container is determined as full.

Other type of food processor may use the pressure indicator system, such as a mincer, a fruit press, a blender, a masticating juicer, a grinder or a slicer.

The invention can thus be applied to a range of food processing systems, where an applied pressure has an influence on the food processing results.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an electric food processor of the type in which the user applies pressure to the food item against a rotary processing member during processing. A pressure indicator is provided for displaying a signal representing at least the user-applied pressure.

This pressure indicator enables the user to be guided during the food processing to apply the most suitable pressure for efficient food processing and/or to preserve the lifetime of the food processing device. The pressure indicator can also indicate other factors which can be derived from the pressure exerted on the rotary processing member, such as a full pulp-container in the case of a juicer or it can indicate that the food processor is consuming too much power which may indicate an abnormal operating mode or a defect.

The invention will first be described in detail with reference to a food processor in the form of a juicer extractor (also referred to below simply as a "juicer").

Figure 1:
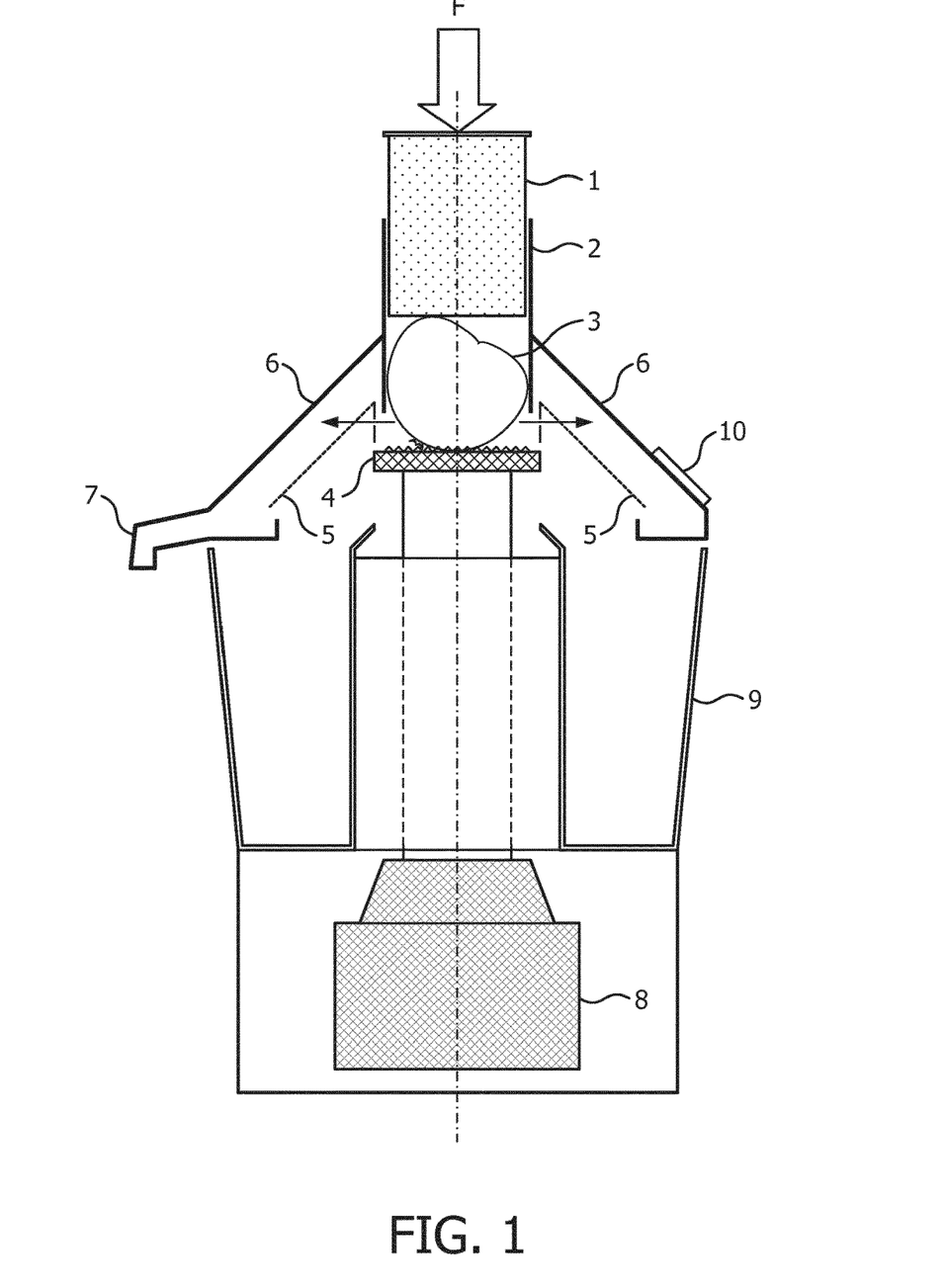
FIG. 1 shows an example of the known configuration of a juice extractor.

FIG. 1 shows an example overview image of a juice extractor.

The juice extractor comprises an input opening for receiving a food item (typically a fruit) to be juiced, at the top of a feeding chute 2. A pressure applicator 1 is received in the input opening, to enable pressure to be applied to the food item 3 by the user during processing.

To extract juice from the fruit 3, the user has to drop the fruit into the feeding chute 2 and has to press the applicator 1 with a specific force F through the feeding chute so that the fruit can be shredded by a rotary processing member in the form of a rasping plate 4.

Due to the centripetal acceleration, the shredded fruit chunks are pressed against the sieve 5 and so the juice is pressed out and is collected in the lid 6.

The juice can run out through a spout 7. An electric motor 8 provides the rotary drive of the rasping plate.

The unwanted pulp drops from the inside of the sieve 5 into a pulp collector 9.

Figure 2:
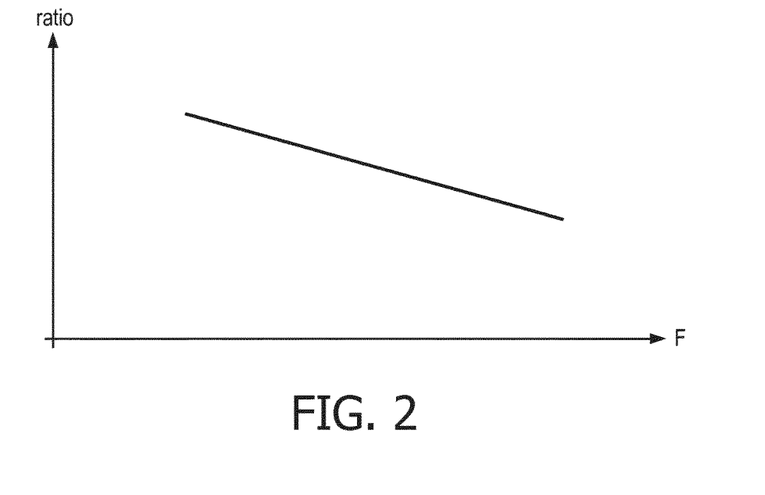
FIG. 2 shows the relationship between applied pressure and juice to pulp ratio.

There is a strong correlation between the amount of extracted juice output from a given amount of pulp, and the force the user is applying to the pressure applicator. This juice-to-pulp ratio is shown in FIG. 2. As shown, the ratio drops with increasing pressure. Thus, the lower the pressing force, the higher the juice/pulp ratio and so the higher the extracted juice output. This may be counter-intuitive for a user, since a low pressure needs to be maintained for effective juicing. Indeed, to have an adequate extracted juice output, a specific pressing force must not exceed.

The invention provides a pressure indicator which indicates when the user is applying a too high pressure to the pressure applicator. The user will receive visual, audible or tactile feedback to know when the pressing force is too high so that he/she can lower the applied pressure. In this way, the user can be guided through the juicing process to result in an optimum juice/pulp ratio and so obtain a higher amount of extracted juice output. Other warnings relating to pressure can also be provided.

FIG. 3 shows three possible visual pressure indicator arrangements.

Figure 3A:
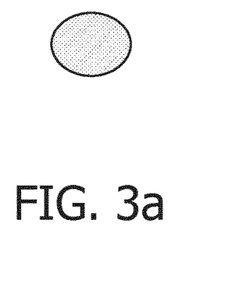
FIG. 3 shows some examples of possible pressure indicators using light output.

FIG. 3(a) shows a single lamp (for example an LED, neon lamp, or similar) as a pressure indication. When the pressure applied too high, the light is turned on, is set to blink or changes colour for example from green to red.

Figure 3B:
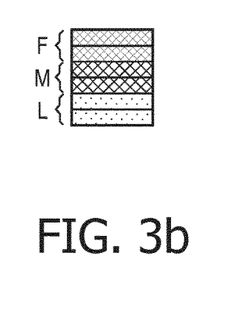

FIG. 3(b) shows a light bar. Several LEDs or lamps show the actual pressure applied to the pressure applicator. There may be three bands, representing too high pressure (H), medium/acceptable pressure (M) and too low pressure (L). The LEDs can have the same or different colours, for example green for the correct pressure, red for too high and yellow for too low.

Figure 3C:
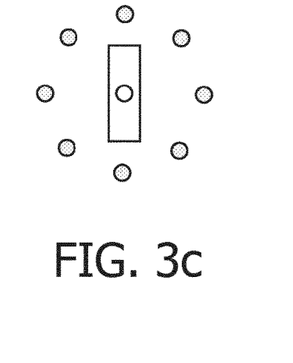

FIG. 3(c) shows an array of lamps located in a ring, for example around the on-off switch. The number of illuminated lamps represents the pressure level. Again, the colour may change.

Instead of lamps, a small display may be used, or mechanical indicators which can be seen by the user.

Alternatively or additionally, sound generators (such as a loudspeaker or mechanical sound generator) can be used. Tactile feedback such as vibration can also be used. The high pressure indication signal can also trigger a shutdown of the juice extractor.

The output can be provided at any suitable location on the device, for example the output device (e.g. a set of lamps) is shown schematically as 10 in FIG. 1.

To measure the force applied, which is directly proportional to the pressure applied, the electrical power consumption P of the motor may be used. The power consumption is defined as the product of voltage V and current I:

$$P = V \times I$$

The pressure p applied to the pressure applicator which is induced by the pressing force F of the user is defined as follows:

$$p = \frac{F}{A_{tube}}$$

When the pressure applied to the pressure applicator increases, also the power consumption of the motor increases; there is a proportional correlation between the pressure and the electrical power of the motor:

p~P

As the power supply voltage is nearly constant, the current I of the motor will increase when the pressure increases:

p~P~I

The current consumption of the motor can thus be used to measure the pressing force F of the user. When the current I of the motor exceeds a specific value, an indication can show the user that the pressing force is too high.

Figure 4:
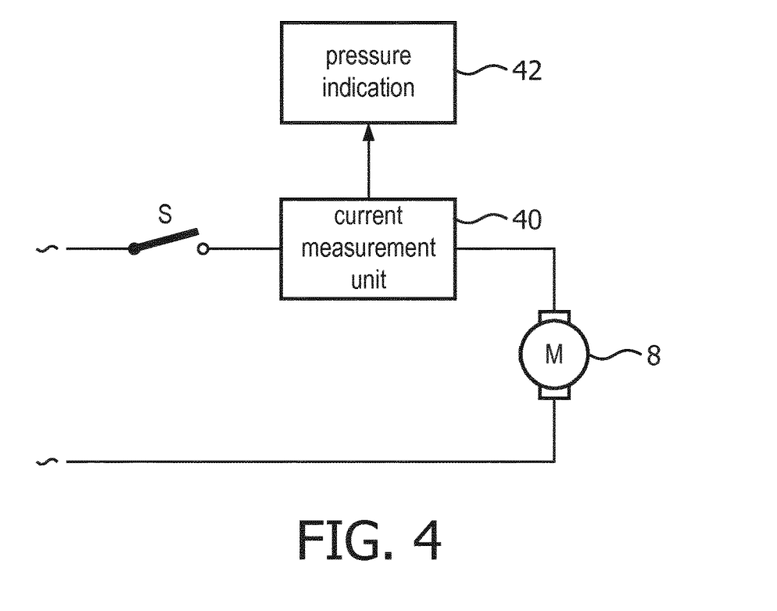
FIG. 4 shows the pressure indicator circuit in schematic form.

FIG. 4 shows in schematic form how to derive a pressure indication from the motor current.

In series with the motor, there is a current measurement circuit 40, which provides a current signal to a pressure indicator arrangement 42.

The current measurement circuit be realized in different ways.

Figure 5:
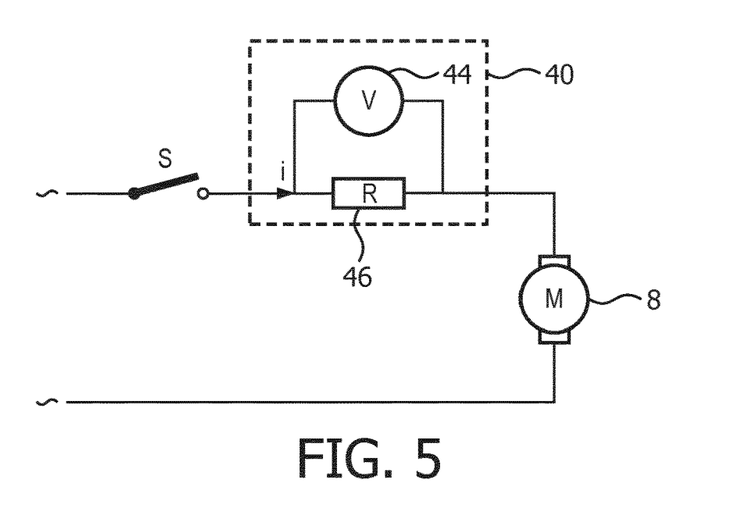
FIG. 5 shows a first more detailed example of current measurement circuit.

FIG. 5 shows a voltage measuring unit 44 for measuring the voltage drop over a series resistor 46.

Figure 6:
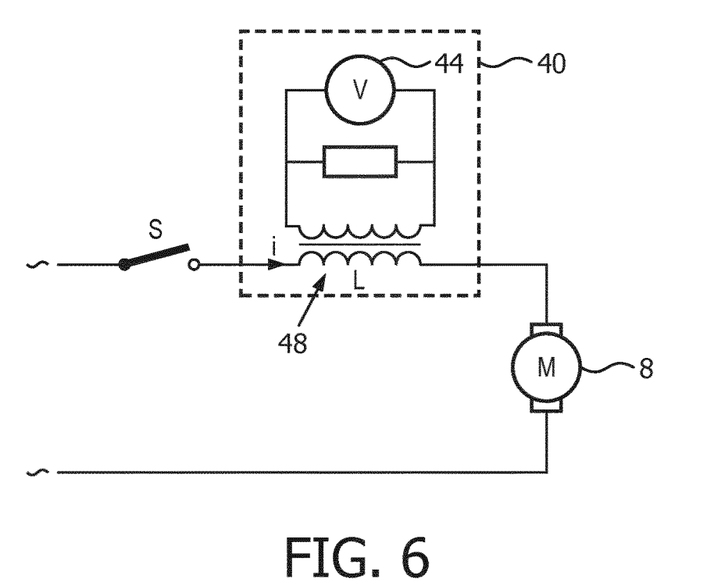
FIG. 6 shows a second more detailed example of current measurement circuit.

FIG. 6 shows a voltage measuring unit 44 for measuring the voltage drop across a current sensing transformer 48.

Other measurement approaches can be used, such as temperature measurement of a series resistor or other electronic component, magnetic field measurement, or detecting deflection of a bimetallic strip.

In general, the higher the pressing force F of the user, the higher is the power consumption of the motor, so the higher the voltage drop measured.

Figure 7:
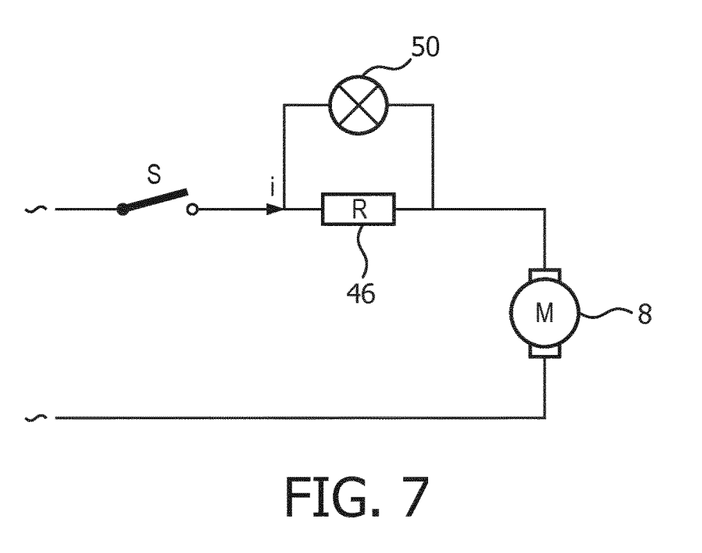
FIG. 7 shows a how a current sense resistor can be used to directly drive a light output.

When using a series resistor 46, the series resistor can be selected to have a suitable value so that it is possible to directly use the voltage drop across the resistor for powering the pressure indication, as shown in FIG. 7. FIG. 7 shows a lamp circuit 50, wherein the voltage across the lamp circuit controls the lamp circuit output. The lamp can be a single lamp with a brightness that is a function of the voltage. After closing the switch S, the motor of the juicer starts. The higher the pressing force F of the user, the higher the power consumption of the motor, the higher the voltage drop and the brighter the lamp will glow.

Figure 8:
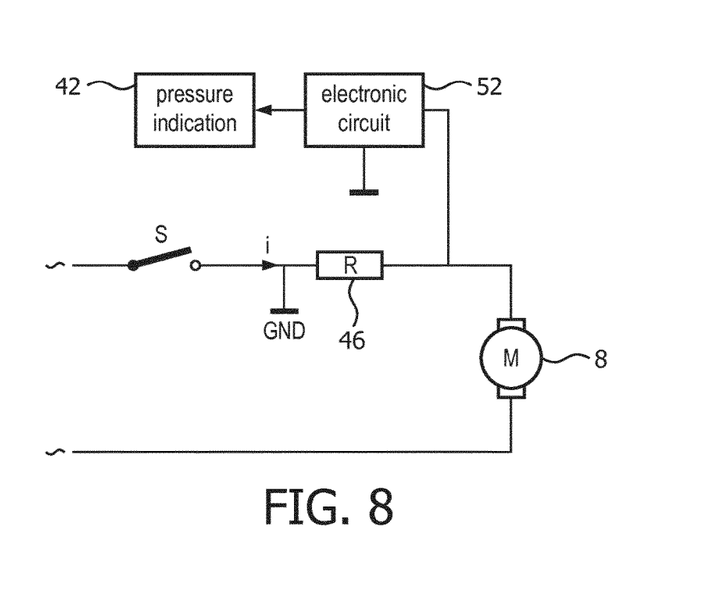
FIG. 8 shows a how a current sense resistor provide a signal to a processor circuit which then drives a pressure indicator.

Alternatively, the measured voltage can be processed by an electronic circuit 52 which in turn controls the controls the pressure indicator arrangement 42, as shown in FIG. 8. The voltage across the resistor can also be used as the power supply to the circuit 52. The electronic circuit 52 can consist of a microcontroller and/or discrete electronic components.

Figure 9:
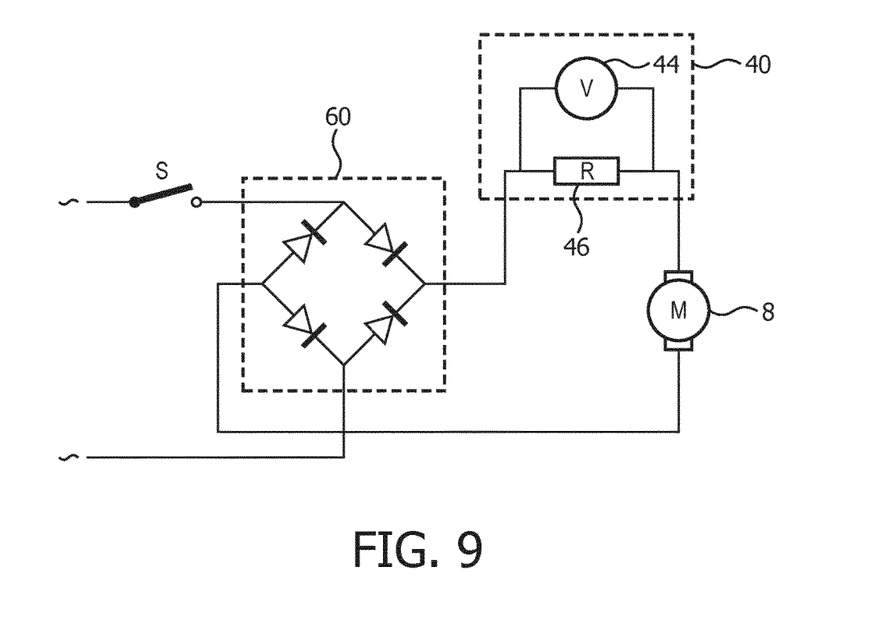
FIG. 9 shows how the current sensing can be in a direct current part of the motor circuit.

Some juicers are equipped with a DC-motor, for which purpose the AC mains voltage is rectified by diodes 60 (or other electronics) as shown in FIG. 9. FIG. 9 shows the current measurement in the rectified path of the motor to get a DC (direct current) voltage instead. The current measurement can equally be provided in the AC path to derive an AC voltage for example if an AC motor is used.

In the examples above, the pressure indication is based on detecting the load on the motor. There are other factors that can influence the load on the motor, so the sensing can be used to provide other warnings. For example a defect or operating failure (such as something wedged in the food processor) can also give rise to increased load. Thus, a first range of motor loads may correspond to normal operation with the user applying a range of pressures, and a second even higher motor load may indicate other failures. Thus, further warnings or automatic shut down functions may be implemented.

In the case of a juicer, when the pulp container 9 is full, there will be forces applied to the rotary processing member from beneath which again will cause the motor load to increase. Thus, it is also possible to provide an indicator to indicate when the pulp container is full. A full pulp container will also reduce the effectiveness of the juicing so an indication of this is also of interest.

The invention has been described above in connection with a juicer. However, the invention can be applied to other food processors, for example a mincer, a fruit press, a grinder, a slicer or a blender.

Figure 10A:
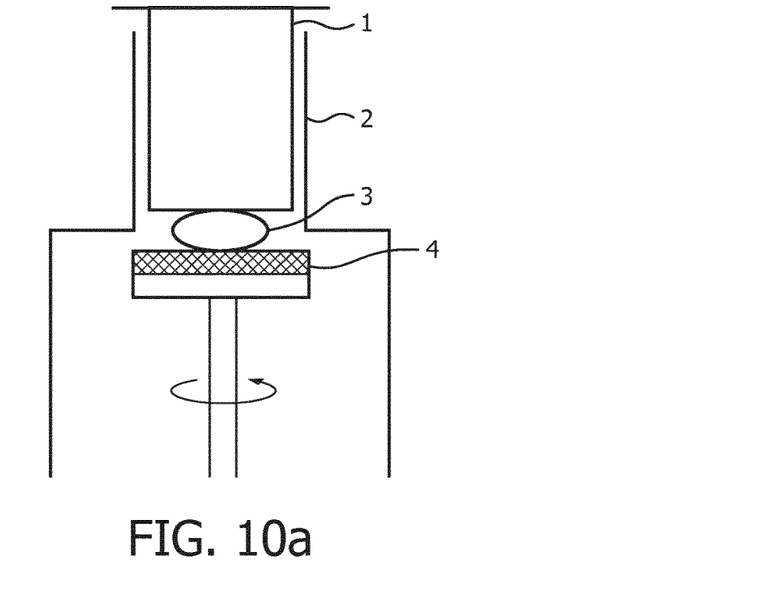
FIG. 10 shows two possible food processor configurations.
Figure 10B:
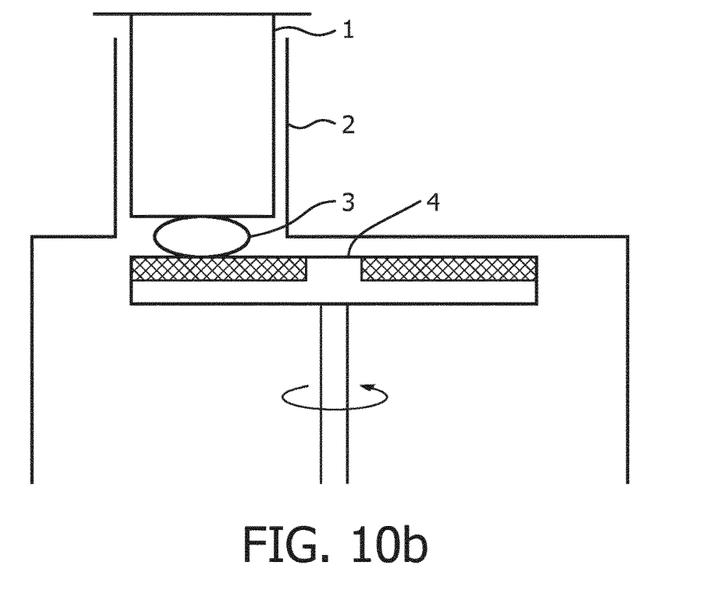

FIG. 10 shows that there are two general configurations of food processor of this type. FIG. 10(a) shows the juicer. The food item 3 is advanced along the axis of rotation of the rotary processing member 4. FIG. 10(b) shows the configuration for a mincer, grater or blender. The food item 3 is advanced offset (but parallel to) the axis of rotation of the rotary processing member 4. This gives a more linear cutting action rather than the twisting action of the juicer.

Figure 11A:
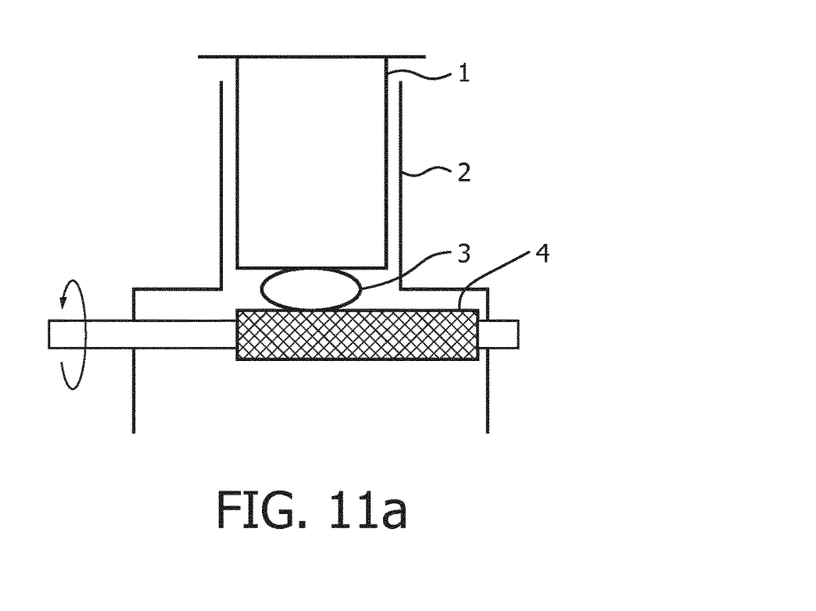
FIG. 11 shows two further possible food processor configurations.
Figure 11B:
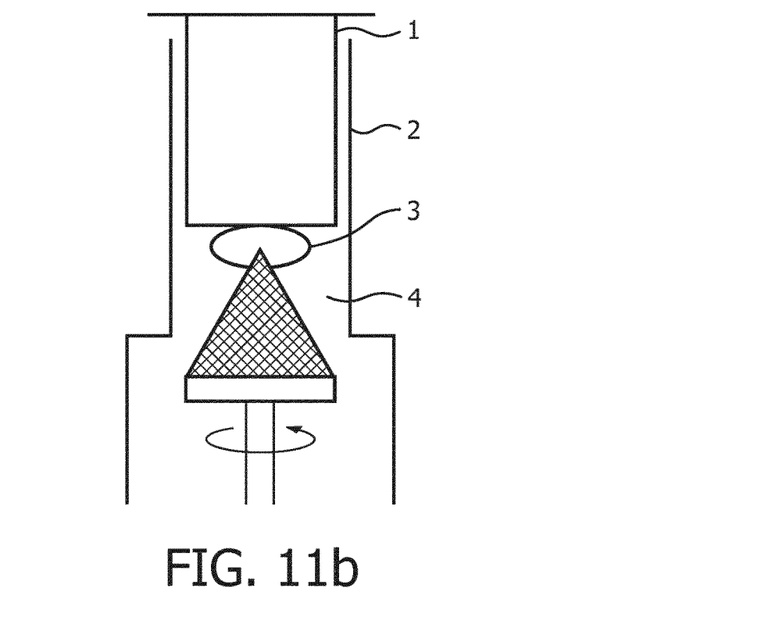

FIG. 11 shows two further possible configurations. FIG. 11(a) shows the general configuration of a mincer, in which a screw rotates around a horizontal axis, so that the food item is advanced by the user in a direction perpendicular to the axis of rotation rather than parallel as in the examples of FIG. 10. The horizontal axis may be instead inclined to the horizontal. FIG. 11(b) shows a masticating juicer having a rotating reamer.

The invention can be applied to all of these types, and the current sensing arrangements described above apply to all examples.

Current sensing is a preferred way to assess the load on the motor and thus derive pressure. However, direct pressure measurement can be applied instead, for example by integrating a pressure sensor in the head of the pressure applicator 1.

The pressure applicator may for example comprise a pusher which houses a spring scale indicating the optimum application force range. This is an alternative way to provide an output signal which is dependent on the pressure being applied to the rotary processing member.

The sensing of the motor current has an advantage that it enables multiple conditions to be detected, such as the user-applied force, the full vessel situation or other motor overload conditions. Some other pressure sensing approaches may for example only enable the user-applied pressure to be determined, but these are within the teaching of this application.

If motor load is to be used, the motor load can be detected by other means, for example temperature sensing or even by detecting a sound pitch. Indeed any known techniques for assessing motor load can be used.

Figure 12:
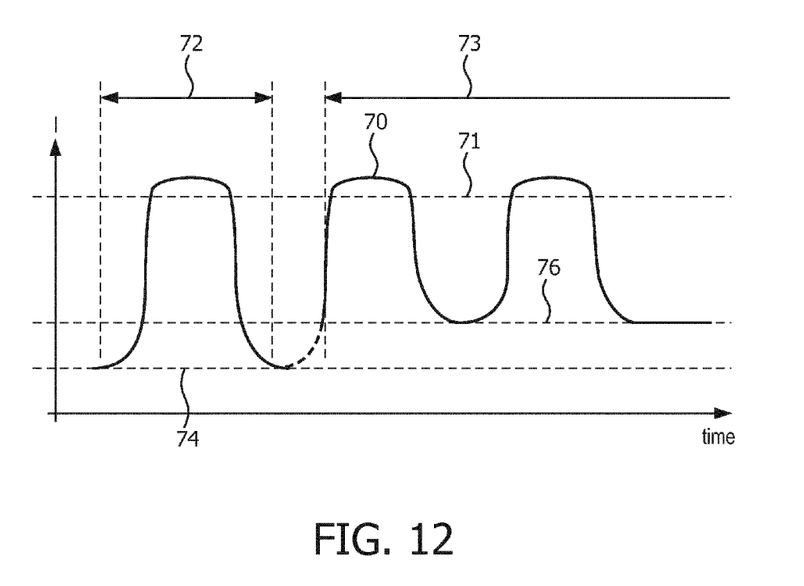
FIG. 12 is used to explain how it is possible to distinguish between user-applied pressure and pressure resulting from a full vessel such as a pulp container.

As mentioned above, the pressure sensing can enable multiple warnings to be provided. FIG. 12 shows how the pressure signal can be analysed to enable discrimination between the user-applied pressure and the pressure resulting from a full pulp container. FIG. 12 shows the measured motor current I versus time.

Plot 70 shows the motor current, which represents the pressure applied to the rotary processing member, as explained above.

When the current exceeds an upper threshold 71, a warning is provided to the user to indicate that the user-applied pressure is too high. As mentioned above, but not shown in FIG. 12, an indication of suitable pressure and an indication of low pressure may optionally also be provided.

The time period 72 represents normal operation with the pulp container not yet full. As shown, there is a part of the time period 72 when the user applied pressure is indeed too high because the current exceeds the threshold 71. Time period 73 represents the motor current when the pulp container is full, and the user is still cyclically applying pressure to the food items.

When the juicer is switched on with an empty pulp container, the current drawn by the motor of the motor has an idle value represented by line 74, and this is the motor current when no user pressure is applied.

When the user applies a force to the pressure applicator, to press a food item against the processing surface, the current rises, depending how strong the pressure value is. When the pressure is released, the current drops back to the idle level 74.

When the pulp container is full as represented by time period 73, the idle current of the motor rises to a second value 76 so that the juicer is consuming more current.

The difference between the two idle values 74 and 76 can be evaluated by the control circuit. When the pulp container is full, the idle current will not return to the lower value 74.

Thus, an increase in the idle current above a threshold (which lies between values 74 and 76) can be used to derive a pressure indication which represents that the pulp container is full. In this way, a minimum value of the current sensed during operation, and over a time period at least as long as a typical pressure application cycle (the time duration 72), can be used to derive a full pulp container indication. The time period 72 may for example be of the order of second e.g. 10 or 20 seconds. Thus, if the minimum current does not drop to the level 74 in the period of 10 or 20 seconds, it is indicative of a permanently present pressure which is caused by a full pulp container. The warning signal relating to user-applied pressure can continue to be given, as shown as well as the full pulp container signal.

The same indicator can be used to convey both types of information (with different colour, sound, flashing pattern or tactile output), or else separate indicators can be used. Furthermore, the controller may halt operation of the juicer if the pulp container is determined as full instead or as well as giving a warning message.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An electric food processor comprising:
  an input opening for receiving a food item to be processed;
  a pressure applicator enabling pressure to be applied by a user to the food item in the input opening during processing;
  a rotary processing member against which the food item is to be pressed during the processing;
  a motor for driving the rotary processing member; and
  a pressure indicator for outputting a signal to the user in response to the user-applied pressure.

2. The food processor as claimed in claim 1, wherein the pressure indicator comprises an output which indicates when the user-applied pressure is too high.

3. The food processor as claimed in claim 1, wherein the pressure indicator comprises a set of outputs for indicating that the user-applied pressure is too high, or too low, or at a suitable level.

4. The food processor as claimed in claim 1, wherein the pressure indicator comprises one or more lights.

5. An electric food processor, comprising:
  an input opening for receiving a food item to be processed;
  a pressure applicator enabling pressure to be applied by a user to the food item in the input opening during processing;
  a rotary processing member against which the food item is to he pressed during the processing;
  a motor for driving the rotary processing member;
  a pressure indicator for providing a signal representing the user-applied pressure; and
  a current sensor for sensing a drive current of the motor, wherein the drive current is representative of the user-applied pressure.

6. The food processor as claimed in claim 5, wherein the current sensor comprises a current sensing resistor and voltage measurement unit.

7. The food processor as claimed in claim 5, wherein the current sensor comprises a current sensing transformer and voltage measurement unit.

8. The food processor as claimed in claim 5, further comprising a circuit for generating the signal representing the user-applied pressure from the sensed current.

9. The food processor as claimed in claim 5, wherein the current sensing is of an AC current or a DC current.

10. The food processor as claimed in claim 1, wherein the food processor is a juicer, and the rotary processing member comprises a juicing member for extracting juice.

11. The food processor as claimed in claim 10, further comprising:
  an outlet to which the extracted juice is provided during juicing;
  a pulp container for storing pulp separated from the extracted juice; and
  an indicator for indicating when the pulp container is full.

12. The food processor as claimed in claim 11, further comprising a current sensor for sensing a drive current of the motor, wherein the pulp container is determined as full based on the current sensed.

13. The food processor as claimed in claim 12, wherein the pulp container is determined as full based on a minimum value of the current sensed.

14. The food processor as claimed in claim 12, further comprising an indicator to indicate when the pulp container is determined as full and/or an interrupt to halt operation of the motor when the pulp container is determined as full.

15. The food processor as claimed in claim 1, wherein the food processor is one of:
  a masticating juicer; or
  a rasping plate juicer; or a mincer; or
a fruit press; or
a grinder; or
a blender; or
a slicer.

16. The food processor as claimed in claim 1, wherein the pressure indicator comprises one or more sounds.

17. The food processor as claimed in claim 1, wherein the pressure indicator comprises a tactile output.

* * * * *